June 10, 1958     R. P. SKERRITT     2,837,868
HUMIDIFIED PLANT HOLDER
Filed May 21, 1956     2 Sheets-Sheet 1

INVENTOR.
Roy P. Skerritt
BY Barthel & Bugbee
Attys

June 10, 1958   R. P. SKERRITT   2,837,868
HUMIDIFIED PLANT HOLDER
Filed May 21, 1956   2 Sheets-Sheet 2
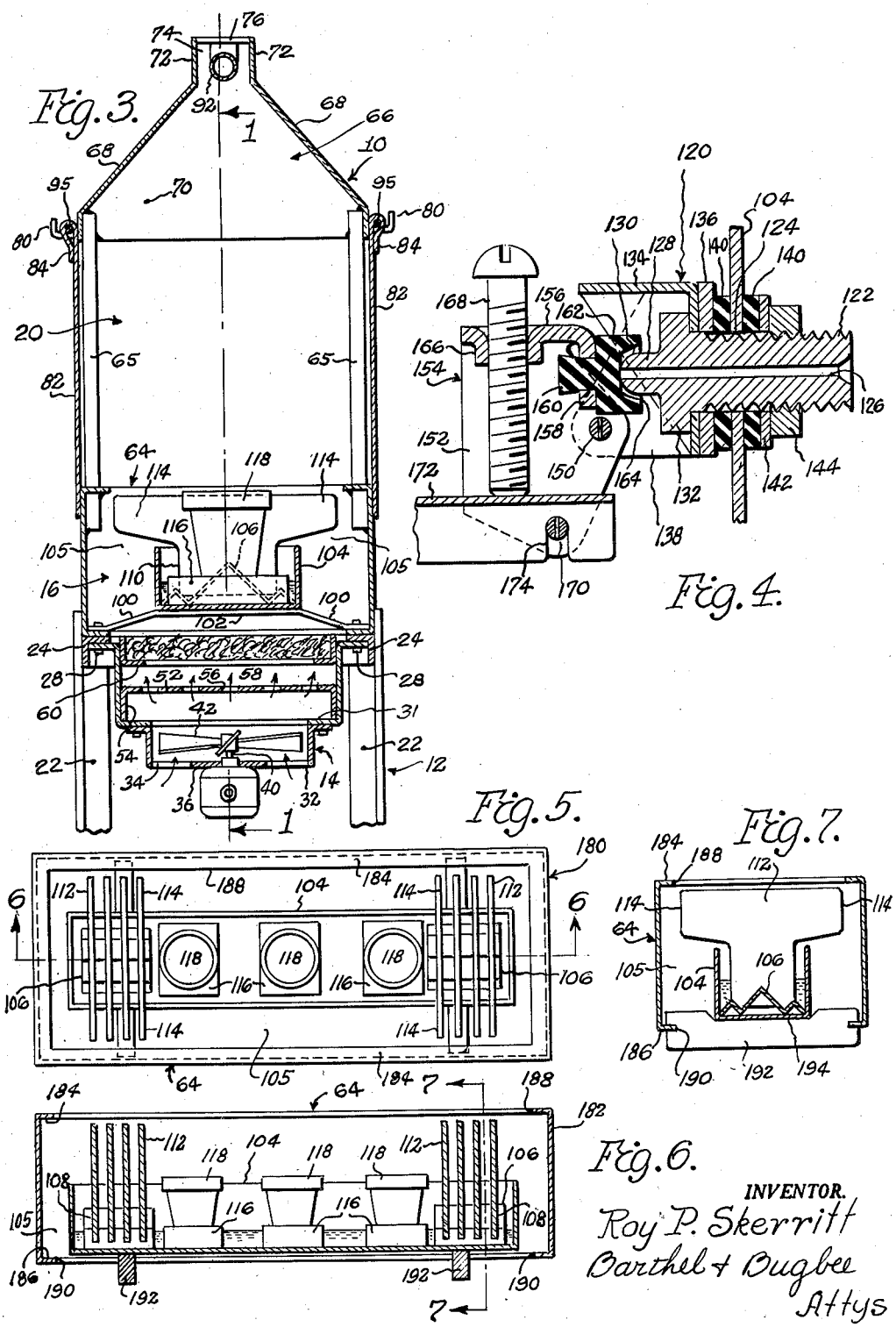
INVENTOR.
Roy P. Skerritt
Barthel + Bugbee
Attys

2,837,868

HUMIDIFIED PLANT HOLDER

Roy P. Skerritt, Detroit, Mich.

Application May 21, 1956, Serial No. 586,028

6 Claims. (Cl. 47—38)

This invention relates to holders for plants and, particularly, to humidified plant holders for florist shops or homes.

One object of this invention is to provide a plant holder with a self-contained humidifier and water holder, whereby the plants are supplied with moisture from the air surrounding them without their having to rely almost exclusively upon the moisture in the soil in which they are planted.

Another object is to provide a humidified plant holder of the foregoing character wherein the air is humidified by being driven upward from a fan between porous humidifier plates resting in a pan of water and raising the water through capillary action, the plants being preferably disposed in pots or other receptacles adjacent the humidifier plates.

Another object is to provide a humidified plant holder of the foregoing character having means associated therewith for irradiating the plants with ultra-violet light under controlled conditions whereby the plants are enabled to receive the equivalent of outside sunlight even though they are kept in a shaded location indoors.

Another object is to provide a humidified plant holder of the foregoing character wherein the plant holder is adapted to be supported either on legs from the floor or on supports resting upon a table, window sill, shelf or the like.

Another object is to provide a humidified plant holder of the foregoing character wherein the level of the water in the water pan is automatically maintained at a substantially uniform level, regardless of the rate of evaporation of water therefrom as a result of the humidification procedure.

Other objects and advantages of the invention will become apparent during the course of the following description of the accompanying drawings, wherein:

Figure 3 is a vertical cross-section taken along the line 3—3 in Figure 1;

Figure 4 is an enlarged fragmentary central vertical section through the float-controlled valve of the humidifier shown at the right-hand side of Figure 1;

Figure 5 is a top plan view of a simplified humidified plant holder without the forced air circulation, automatic water level control and irradiation shown in Figures 1 to 3 inclusive;

Figure 6 is a central vertical section taken along the line 6—6 in Figure 5; and Figure 7 is a vertical cross-section taken along the line 7—7 in Figure 6.

Figures 1, 2:
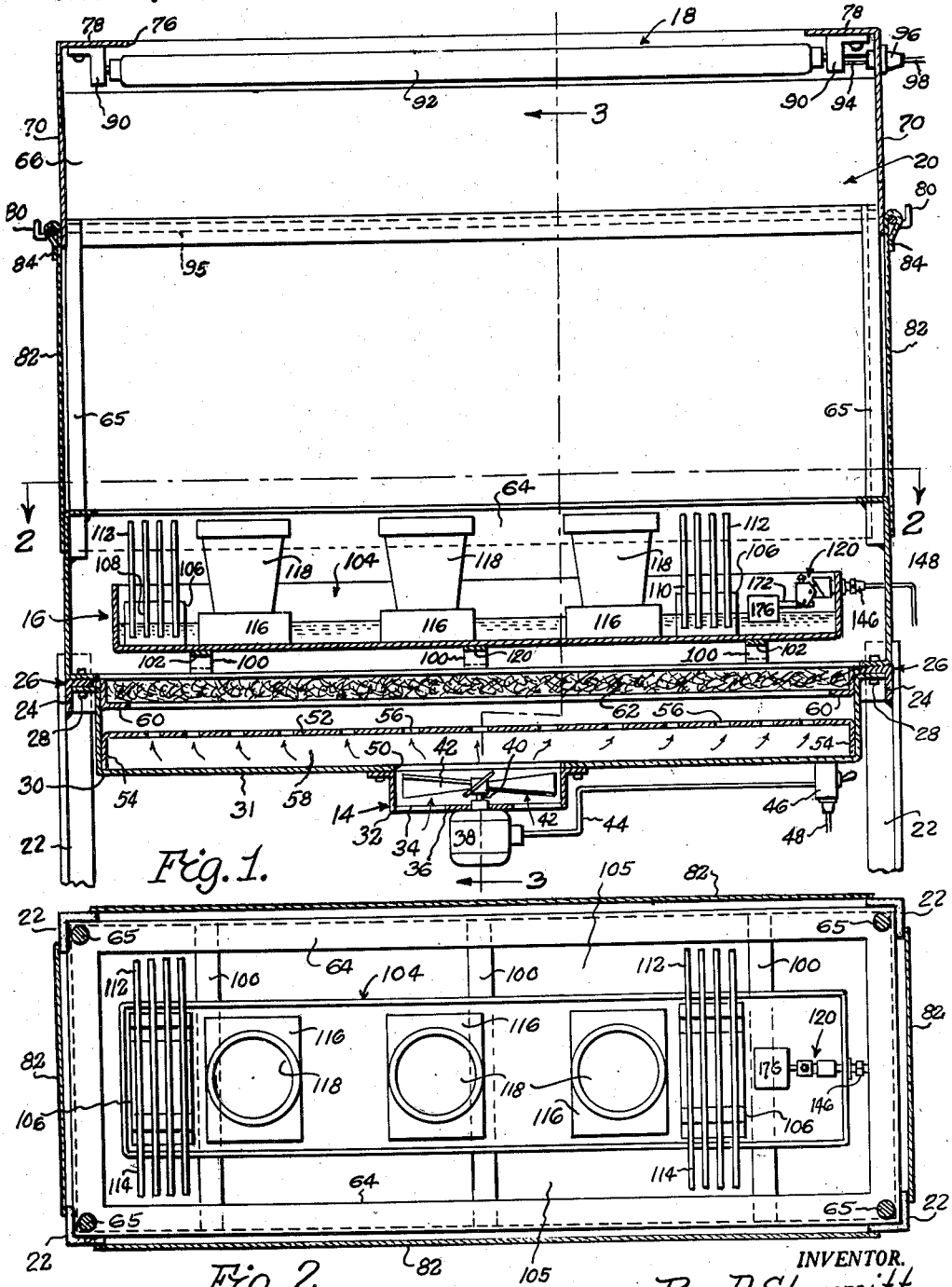
Figure 1 is a central vertical section through an irradiated air circulating humidified plant holder, according to one form of the invention, taken along the line 1—1 in Figure 3, with the plants omitted.
Figure 2 is a horizontal section taken along the line 2—2 in Figure 1.

Referring to the drawings in detail, Figures 1 to 3 inclusive show an irradiated air-circulating humidified plant holder, generally designated 10, which consists generally of a supporting structure 12, an air circulating unit 14, an air humidifier and plant support 16, and a plant irradiating device 18 mounted within a housing 20 mounted on the supporting structure 12. The supporting structure 12, which may be of any suitable type, the type shown being merely for purposes of illustration and not limitation, consists of supporting legs 22 preferably of angle construction welded or otherwise secured to horizontal angle members 24 forming a lower rectangular border frame 26. Secured as at 28 by rivets or other suitable fasteners, is the upper edge of an air housing 30 of rectangular shape having a fan housing 32 riveted or otherwise secured to the central portion of the bottom 31 thereof. The fan housing 32 has air inlet apertures 34 on opposite sides of a center portion 36 which supports a fan motor 38 having an upwardly-directed motor shaft 40 carrying an air circulating fan 42 within the fan housing 32. The fan motor 38 is supplied with electric current through a cable or conduit 44 connected to a switch 46 from which a flexible cable 48 runs to a suitable wall outlet (not shown).

The bottom 31 of the air housing 30 is provided with an aperture 50 immediately above the fan 42 and above this is mounted an edge-flanged perforated horizontal plate 52, the flanges 54 of which rest upon the inner surface of the bottom 31 so as to space the perforations 56 away from the bottom 31 and provide an air chamber 58 therebetween. Mounted within the upper part of the air housing 30 is a rectangular angle member frame 60 which receives an air diffuser 62 of fibrous material, such as fibrous glass, and loosely packed to provide pores through which the air from the fan 42 may flow upward and be diffused thereby.

Mounted upon the border frame 26 and rising therefrom is an open-topped plant housing 64 of box-shaped form, the flanged lower edges of which are secured to the border frame 26. Welded or otherwise secured to the housing 64 and rising from the flanged upper edges thereof are vertical rods 65 (Figure 2). Secured as by welding to and rising from the upper ends of the vertical rods 66 is an upwardly-inclined irradiating device housing 66 having upwardly-converging side walls 68 and end walls 70 which at their upper ends are bent parallel to one another as at 72 (Figure 3) to form a lamp housing portion 74 with an open top as at 76 and horizontal end portions 78. Secured to the corners of the housing 66 are hooks 80. Suspended from the hooks 80 are closure curtains 82 preferably of flexible transparent sheet material such as transparent synthetic plastic or the like, either white or colored, the upper edges of which are bent reversely back upon themselves as at 84 for receiving horizontal rods or wires 85, the ends of which rest upon the hooks 80.

Secured to and depending from the under sides of the horizontal top portions 78 are angle brackets 90 in which is mounted an elongated ultra-violet electric lighting tube 92 of a conventional type supplied with electricity through conductors 94 leading through a lead-in fixture 96 of insulating material to a flexible cable 98 which in turn leads to a conventional electric lighting outlet (not shown).

Extending between the opposite sides of the border frame 26 and secured thereto by fasteners or other suitable means are spaced parallel cross members 100 having raised central horizontal portions 102. Mounted on the horizontal portions 102 is the elongated water pan 104 of the humidifier 16, the pan 104 being shorter and narrower than the plant housing 64 so as to provide air flow spaces 105 therebetween (Figure 2). Mounted in the pan 104 near the opposite ends thereof are humidifier plate racks 106 of approximately W-shaped form and preferably bent out of sheet metal or other suitable material having parallel multiple slots 108 in which are mounted the lower or supporting portions 110 of humidifier plates 112. Each plate 112 is approximately T-shaped in form and has horizontally-projecting wings 114 extending laterally from the lower portion 110 thereof. The wings 114 extend laterally over the edges of the pan 104 into the air flow spaces 105 so as to be subjected to the upwardly-travelling air currents produced by the fan 42. The humidifier plates 112 are preferably of porous material having capillary action, plates of compressed fibrous glass having been found suitable for this purpose. Also mounted in the pan 104 between the humidifier plate holders 106 are blocks 116 forming supports for plant receptacles or pots 118. The blocks 116 are preferably of such heights as to be above the level of the surface of the water W in the pan 104.

One of the humidifier plate holders 106 is spaced away from the nearest end of the pan 104 to provide space for a float-operated water control valve unit, generally designated 120. The latter consists of a threaded water inlet nipple 122 (Figure 4) inserted through a hole 124 in the pan 104 and having an inlet passageway 126 therein terminating in a water nozzle portion 128 having a rounded valve seat 130 at the end thereof surrounding the passageway 126. Mounted on the nipple 122 between its enlargement 132 and the wall of the pan 104 is a spray hood 134 and an approximately U-shaped bracket 136 with horizontal parallel arms 138. Resilient washers 140 of synthetic rubber or the like and a metal washer 142 complete this assembly, which is held in place by a nut 144 threaded upon the outer end portion of the nipple 122. The latter is connected by a coupling 146 to a water supply pipe 148 which in turn is connected to an ordinary cold water pipe (not shown).

The parallel arms 138 of the bracket 136 are drilled in alignment to receive a pivot pin 150 (Figure 4), such as a cotter pin, on which are mounted the parallel wings 152 of a valve closure carrier 154 of approximately U-shaped cross-section with a top or bridge wall 156 having a downwardly-bent end portion 158. The end portion 158 is drilled to receive the stem 160 of a cup-shaped valve closure member 162 of resilient material, such as synthetic rubber, the cup-shaped surface 164 of which is adapted to engage the valve seat 130 on the nozzle portion 128 of the nipple 122. The bridge or top portion 156 is provided with an internally-threaded tubular boss 166 into which is threaded a downwardly-projecting float arm adjusting screw 168.

The wings 152 below the pivot pin 150 are drilled additionally in alignment to receive a float-engaging pin 170, such as a cotter pin, disposed parallel to the pivot pin 150. Mounted on the pin 170 is a channel 172 having aligned notches 174 in its flanges receiving the pin 170 with the adjusting screw 168 engaging the web thereof. The channel arm 172 at its outer end carries a float 176 (Figure 1) of any suitable buoyant material, such as foam glass.

In the operation of the humidified plant holder 10 of Figures 1 to 4 inclusive, let it be assumed that water has been admitted through the pipe 148 to fill the pan 104 to the desired water level and that electricity has been supplied to the cables 48 and 98. Let it also be assumed that the humidifier plates have been placed in their proper positions in the racks 106 with the lower ends of their lower central portions 110 dipping into the water W in the pan 104. Let it also be assumed that the plants have been placed in receptacles such as the pots 118 on the blocks 116.

When the fan 42 is rotated by closing the switch 46 to energize the motor 38, air proceeds in the direction of the arrows through the perforated plate 52 and thence through the fibrous filter material 62 and the spaces 105 past the wings 114 of the evaporator plates 112. As the air passes upward, it picks up moisture from the wings 114 and becomes humidified, this moist air then passing upward through the foliage of the plants and thereby supplying moisture to it. When it is desired to irradiate the plants with ultra-violet light, the ultra-violet lighting tube 92 is energised and rays of ultra-violet light are radiated downward upon the plants.

Meanwhile, the float-operated valve unit 120 maintains the water level in the pan 104 at a constant height, constantly replenishing the water as the level falls by reason of evaporation from the humidifier plates 112. When the water level falls, the float 176 descends, swinging the float arm 172 and valve closure carrier 154 downward and consequently swinging the valve closure 162 away from the valve seat 130, uncovering the passageway 126 and causing water to flow into the pan 104. When the water level rises, swinging the float 176, arm 172 and carrier 156 upward to move the valve closure 162 against the valve seat 130, the water flow is halted until the next descent of the float 176. The valve unit 120 of Figure 4 is described and claimed in my co-pending application Serial No. 480,538 filed January 7, 1955, for Heating System Humidifier.

In this manner, the plants are provided with properly humidified air and also with the necessary amount of ultra-violet light to correspond to the ultra-violet light which they would receive from the sun if they were growing out in the open, but which is ordinarily absorbed by window glass as the light passes through windows. Furthermore, the humidified plant holder 10 of the present invention may be used in places where it is not possible for sunlight to reach, even after passing through windows, yet the growth of the plant will be properly enhanced and the plants themselves maintained in a healthy condition by means of the humidification of the air and the irradiation by ultra-violet light from the tube 92.

The simplified humidified plant holder, generally designated 180, shown in Figures 5 to 7 inclusive, is generally similar in many respects to the plant holder 10 of Figure 1, similar parts bearing the same reference numerals, but it omits the automatic water level control unit 120 of Figures 1 and 4, also omits the fan 42 and its motor 38, and likewise omits the ultra-violet ray tube 92 of the humidified plant holder 10. Instead, the plant holder 180 consists of an open-topped and open-bottomed box-like housing 182 having upper and lower flanges 184 and 186 surrounding upper and lower openings 188 and 190 respectively. Extending across the lower opening 190 and notched to receive the flanges 186 at their ends are two parallel supporting blocks 192 which are adapted to rest upon a supporting surface such as a table or window sill. The blocks 192 have recesses 194 at their midportions adapted to receive the bottom of the pan 104 which in turn contains spaced humidifier plate racks 106 having notches 108 containing spaced parallel humidifier plates 112 as described in connection with the humidified plant holder 10 of Figures 1 to 4 inclusive. The pan 104 also contains blocks 116 upon which plant receptacles or pots 118 rest, as described above.

In the operation of the plant holder 180, the pan 104 is filled with water to the desired level and the plants, as before, are placed in the receptacles 118. Air flows naturally upward by convection through the spaces 105 outside the walls of the pan 104 past the wings 114 of the humidifier plates 112, picking up water therefrom and supplying this to the plant foliage. The dry air enters through the lower aperture 190 and the humidified air leaves through the upper aperture 188. The water is replaced manually in the pan 104 as its level drops through evaporation.

What I claim is:

1. A humidified plant holder comprising a housing having side walls and air inlet and outlet apertures in the lower and upper portions thereof respectively, a water pan mounted in said housing in laterally-spaced relationship to said walls and having an air passageway disposed between said pan and said walls, means for supporting evaporator plates in spaced parallel relationship in said pan, evaporator plates of capillary material mounted in said plate-supporting means with portions of said plates projecting downwardly into said pan, said plates having outwardly-extending lateral wings projecting into said air passageway, and means for supporting a plant in said pan.

2. A humidified plant holder comprising a housing having side walls and end walls and air inlet and outlet apertures in the lower and upper portions thereof respectively, a water pan mounted in said housing in laterally-spaced relationship to said side walls and end walls and having an air passageway disposed between said pan and said side walls and end walls, means for supporting evaporator plates in spaced parallel relationship in said pan, evaporator plates of capillary material mounted in said plate-supporting means with portions of said plates projecting downwardly into said pan, said plates having outwardly-extending lateral wings projecting into said air passageway, and means for supporting a plant in said pan.

3. A humidified plant holder comprising a housing having side walls and air inlet and outlet apertures in the lower and upper portions thereof respectively, a water pan mounted in said housing in laterally-spaced relationship to said walls and having an air passageway disposed between said pan and said walls, means for supporting evaporator plates in spaced parallel relationship in said pan, evaporator plates of capillary material mounted in said plate-supporting means with portions of said plates projecting downwardly into said pan, said plates having outwardly-extending lateral wings projecting into said air passageway, and means for supporting a plant in said pan, said plate-supporting means including a plate rack adapted to rest upon said pan and having spaced parallel recesses therein receiving said plates.

4. A humidified plant holder comprising a housing having side walls and air inlet and outlet apertures in the lower and upper portions thereof respectively, a water pan mounted in said housing in laterally-spaced relationship to said walls and having an air passageway disposed between said pan and said walls, means for supporting evaporator plates in spaced parallel relationship in said pan, evaporator plates of capillary material mounted in said plate-supporting means with portions of said plates projecting downwardly into said pan, said plates having outwardly-extending lateral wings projecting into said air passageway, means for supporting a plant in said pan, and a motor-driven air circulator mounted adjacent said housing and arranged to discharge air into said inlet aperture and upwardly through said air passageway between said wings.

5. A humidified plant holder comprising a housing having side walls and air inlet and outlet apertures in the lower and upper portions thereof respectively, a water pan mounted in said housing and having an air passageway disposed therebetween, means for supporting evaporator plates in spaced parallel relationship in said pan, evaporator plates of capillary material mounted in said plate-supporting means with portions of said plates projecting downwardly into said pan, said plates having extensions projecting into said air passageway, means for supporting a plant in said pan, a motor-driven air circulator mounted adjacent said housing and arranged to discharge air into said inlet aperture, and an air diffuser disposed between said air circulator and said housing.

6. A humidified plant holder comprising a housing having side walls and air inlet and outlet apertures in the lower and upper portions thereof respectively, a water pan mounted in said housing and having an air passageway disposed therebetween, means for supporting evaporator plates in spaced parallel relationship in said pan, evaporator plates of capillary material mounted in said plate-supporting means with portions of said plates projecting downwardly into said pan, said plates having extensions projecting into said air passageway, means for supporting a plant in said pan, a lamp support mounted on said housing, an ultra-violet radiation fixture mounted on said lamp support, a motor-driven air circulator mounted adjacent said housing and arranged to discharge air into said inlet aperture, and an air diffuser disposed between said air circulator and said housing.

References Cited in the file of this patent

UNITED STATES PATENTS

| 1,213,940 | Parker | Jan. 30, 1917 |
| 1,960,001 | Davies | May 22, 1934 |
| 2,002,380 | Wernicke et al. | May 21, 1935 |
| 2,084,005 | Richards | June 15, 1937 |
| 2,300,776 | Collins | Nov. 3, 1942 |